July 30, 1968  R. L. FRASER  3,394,823
APPARATUS FOR TRANSFERRING A LOAD OBJECT
Filed June 3, 1966  2 Sheets-Sheet 1

INVENTOR.
R. LEE FRASER
BY John R. Walker, III
   Attorney

July 30, 1968                R. L. FRASER                3,394,823
           APPARATUS FOR TRANSFERRING A LOAD OBJECT
Filed June 3, 1966                                2 Sheets-Sheet 2
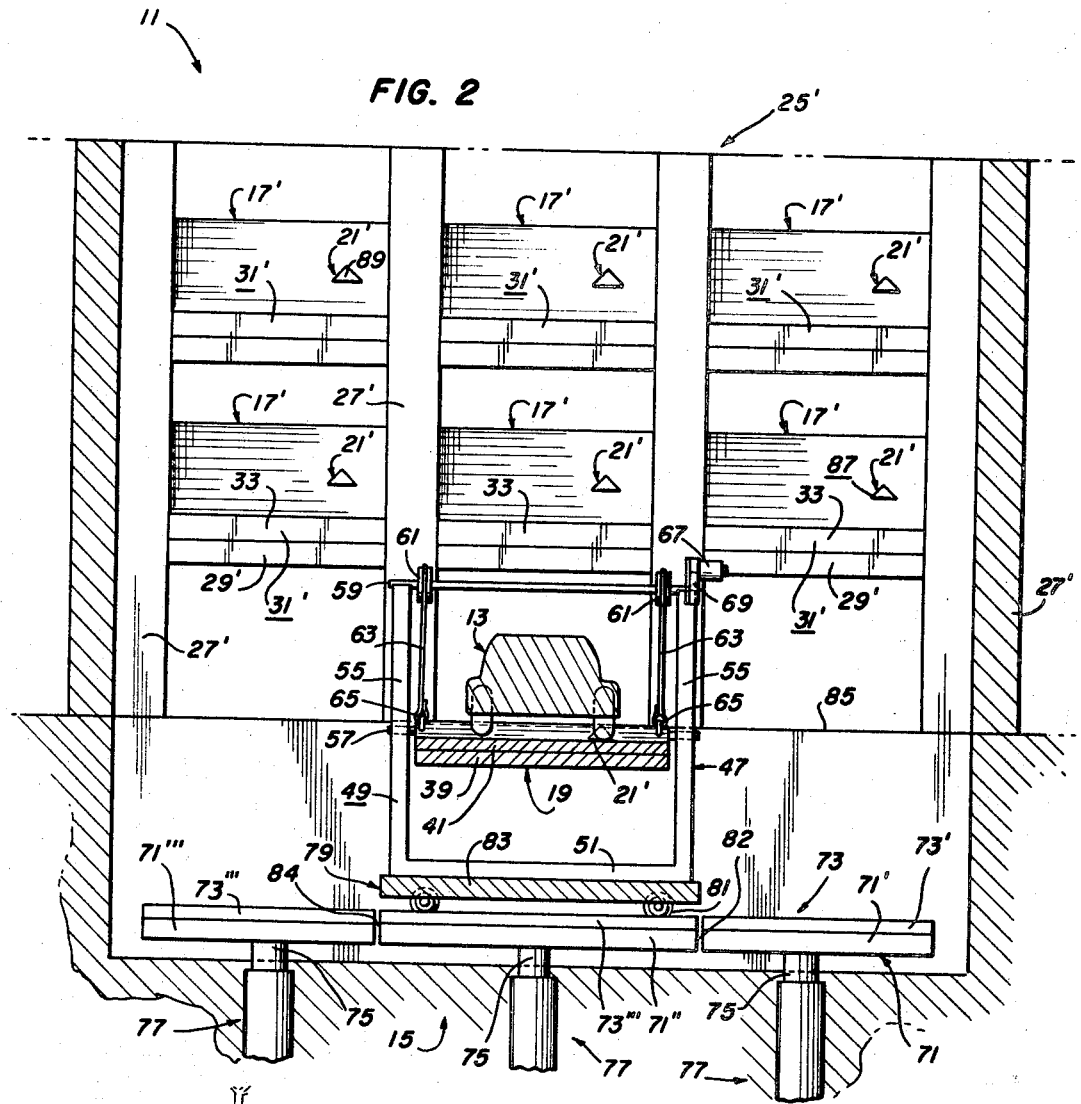
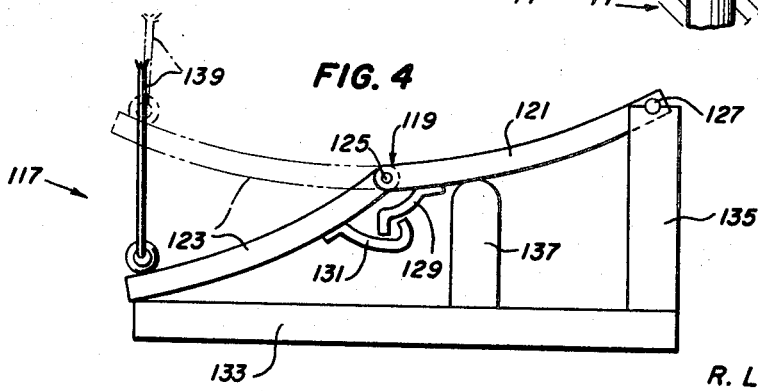
INVENTOR.
R. LEE FRASER
BY John R. Walker, II
Attorney

United States Patent Office 3,394,823
Patented July 30, 1968

3,394,823
APPARATUS FOR TRANSFERRING A
LOAD OBJECT
R. Lee Fraser, 3723 Northwood Drive,
Memphis, Tenn. 38111
Filed June 3, 1966, Ser. No. 555,117
7 Claims. (Cl. 214—16.1)

This invention relates to material handling apparatuses generally and particularly relates to an apparatus for elevating and shifting a load object such as an automobile or a freight container. The invention basically concerns means for automatically moving a load object onto or away from an elevatable platform or movable ramp.

The typical multi-floor automobile parking garage is provided with inclined runways extending between the floors for driving the automobiles from the ground floor to a desired elevated parking floor and for returning the automobile to the ground floor. When elevatingly parking an automobile by such means, considerable tire and brake wear occur and the engine of the automobile is taxed considerably; the garage attendant or driver may roughly handle the automobile. These and other combined factors result in relatively rapid depreciation of the automobile and frequent and costly repairs and maintenance.

To lessen the above-mentioned problems, various apparatuses have been designed which bodily elevate the automobile to a desired parking floor. A problem of considerable moment in the design of such devices was in devising a relatively simple means for quickly and smoothly transferring an automobile onto or away from the platform of the lift or elevator. Various apparatuses utilizing conveyors, belts, chains, fluid operable devices and various counterbalancing means have been employed in an effort to effect a smooth rapid transfer of an automobile from the lifting platform to the fixed floor structure of the garage. Such apparatuses, in general, were complicated and acted slowly, or for other reasons have not been found to be completely satisfactory.

In storing freight containers or handling inert load objects in warehouses or multi-floor storage houses, a similar problem has existed in how to effectively transfer a load object from the lifting platform of the freight elevator to the stationary floor of the warehouse. Loading and unloading the freight elevator are usually carried out manually or with the use of an industrial lift truck, or by other slow and costly means. Whether the load object to be handled is mobile and vehicular, or whether it is a packaged product or a freight container, a major problem has been how to transfer the object between an at rest position on the movable lift platform structure of the elevator and an at rest position on the stationary floor structure of the garage or warehouse.

The apparatus of the present invention seeks to solve the above-mentioned problems and has as a primary object to provide a practical means for transferring a load object, in the shortest possible traveling time utilizing gravity, between the lifting platform or lifting ramp structure and the stationary structure of an elevated floor of a parking garage or freight warehouse.

A further object is to provide means for utilizing the force of gravity in effecting a transference of a load object and to move the load object somewhat in the manner of a swinging pendulum; the structure of the invention includes a movable ramp having a curved treadway and includes a fixed ramp having a correspondingly curved treadway; a load object is adapted to be moved under the force of gravity along the curved treadways respectively of the fixed and movable ramps and along a path much like the path of a swinging pendulum.

A further object is to provide means whereby the load object is always substantially started rapidly and stopped rapidly thereby effecting a rapid transfer rate and a negligible stopping shock at the end of the path of travel of the load object.

A further object is to provide automatically operable check means for engaging and releasably checking the movement of a load object.

A further object is to provide fixed and movable ramp means having curved smooth treadway structure and such means adapted to handle or horizontally shift a vehicular or wheeled load object.

A further object is to provide fixed and movable ramp means having curved treadway structure including respectively a multiplicity of parallel journaled rollers for rollingly engaging and transferring a freight container or inert product package.

A further object is to provide hoisting means for pivotally raising or lowering the movable ramp for respectively receiving or removing a load object from the treadway structure of the ramp.

A further object is to provide material handling means including a movable curved ramp member and confrontingly arranged first and second vertically and horizontally arranged pluralities or banks of fixed curved ramp members arranged respectively on opposite sides of said movable ramp member.

A further object is to provide means for vertically and horizontally moving said movable ramp member for placing it in register with a selected one of the fixed ramps and for transferring a load object on or away from the movable ramp or a selected fixed ramp.

A further object is to provide a movable ramp including means for pivotally turning or tilting the ramp in one direction or a contra-direction thereto, thereby providing means for receiving or removing a load object of a fixed ramp in either the first or the second bank of fixed ramps and for moving the load object in one direction or a contra-direction thereto.

A further object is to provide movable ramp means including first and second ramp sections hinged together and such ramp means operable to further expedite the movement of a load object onto or away from the movable ramp treadway structure.

The means by which the foregoing and other objects of the present invention are accomplished, and the manner of their accomplishment may be readily understood from the specification upon reference to the accompanying drawings, in which:

FIG. 2 is a vertical plane, schematically illustrated sectional view taken as on the line II—II of FIG. 1.

FIG. 4 schematically illustrates another embodiment of the apparatus.

Figure 1:
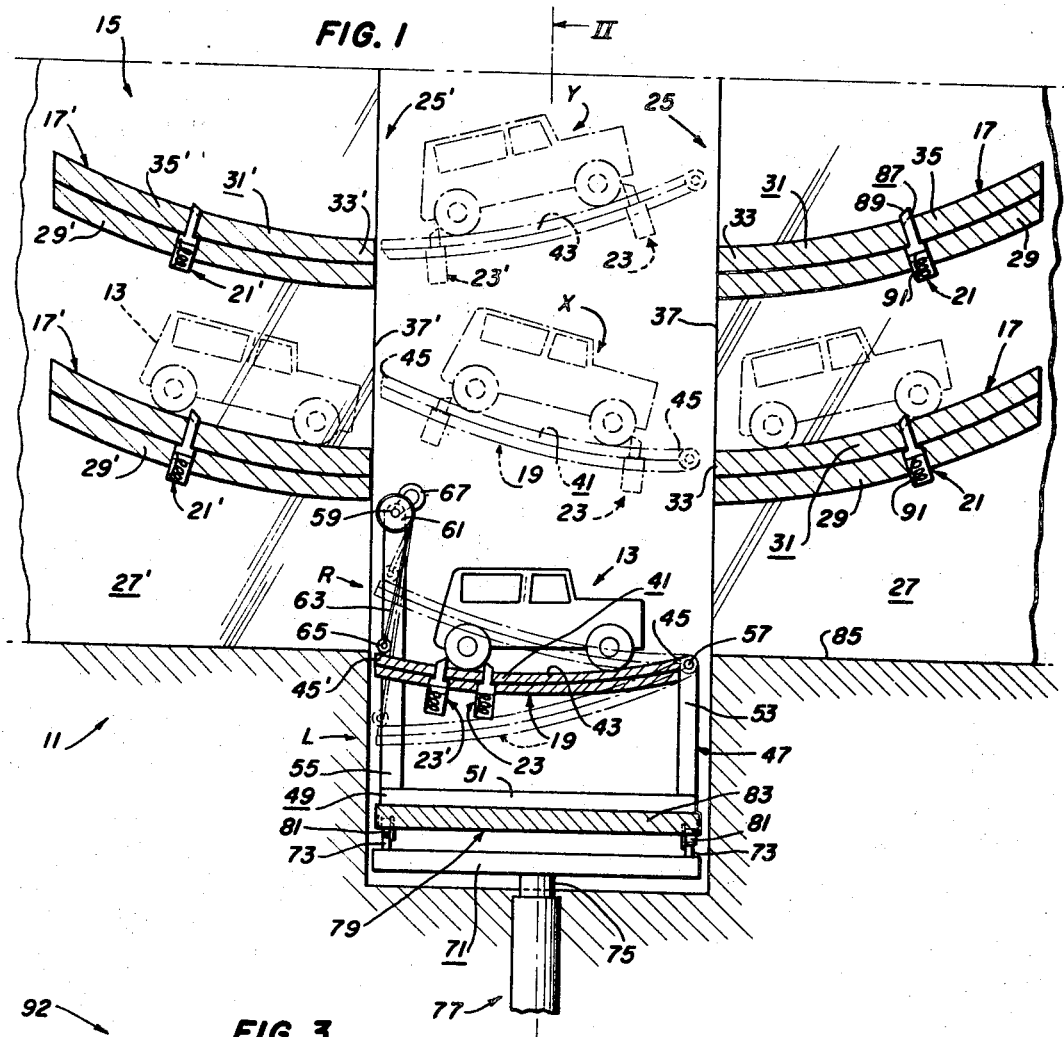
FIG. 1 is a vertical plane, schematically illustrated sectional view of an embodiment of the apparatus adapted for handling a vehicular load object.

The apparatus 11 as illustrated in FIGS. 1 and 2 is adapted for handling an automobile 13 and is illustrated as being incorporated in the structure of a parking garage 15 (fragmentarily shown).

Apparatus 11 includes basically fixed ramp means including a plurality of fixed ramp members 17, 17', movable ramp means including a movable ramp member 19; and check means including check members 21, 21' mounted respectively on fixed ramp members 17, 17' and check members 23, 23' mounted on movable ramp member 19.

Parking garage 15 includes two confrontingly arranged banks of fixed ramp members 25, 25' supported respectively by supporting wall structure 27, 27'. Each ramp member of fixed ramp members 17, 17' includes respectively supporting structure 29, 29' and treadway structure 31, 31'. Supporting structure 29, 29' is preferably curvilinear in form and is supported by wall structure 27, 27' of the parking garage. Treadway structure 31, 31' respectively of ramp members 17, 17' overlie and are supported respectively by supporting structure 29, 29'. Each treadway structure 31, 31' is in an upwardly curved or concave form and is obliquely arranged relative to the horizontal. Each of treadway structures 31, 31' includes respectively a horizontally extending edge portion 33, 33' and an upwardly curved or concave inclined body portion 35, 35' inclined upwardly from edge portions 33, 33'.

Fixed ramp members 17 of first bank 25 of ramp members are respectively horizontally and vertically spaced and arranged uniformly with the respective treadway structure edge portion 33 of each ramp member being contiguous a vertical plane 37 common to each other fixed ramp member of bank 25. In like manner second bank 25' of fixed ramp members 17' are vertically spaced and arranged uniformly with each edge portion 33' being contiguous a vertical plane 37' common to each other fixed ramp member of bank 25'. Fixed ramp members 17, 17' are preferably arranged in confrontingly facing pairs of members arranged respectively on opposite sides or ends of movable ramp member 19 when the member is arranged in a neutral position as illustrated in full lines in FIG. 1.

Movable ramp member 19 includes a rigid frame structure 39 and an upwardly facing treadway structure 41 superjacently secured to and supported by frame structure 39. Treadway structure 41 is generally curved and includes an upwardly facing curved or concave body portion 43 and parallel horizontally extending first and second edge portions 45, 45' disposed respectively along the opposite side edges of body portion 43. Treadway structures 31, 31' of the respective fixed ramp members 17, 17', and treadway structure 41 of movable ramp member 19 respectively include structure defining substantially a smooth curved or concave running surface for supportingly engaging the wheels of automobile 13. The radius of treadway structures 31, 31' are preferably substantially the same as the radius of the treadway structure 41.

Pivot means pivotally support movable ramp member 19 for pivotal movement of the ramp member between a raised position R and a lowered position L (see FIG. 1). The movable ramp means of the apparatus additionally includes means for bodily, horizontally, vertically and rotatably moving ramp member 19 and for positioning the member in register with a selected one of fixed ramp members 17, 17'.

A movable ramp unit 47 pivotally supports and actuates movable ramp member 19. Ramp unit 47 includes open framework 49 and pivot and hoisting means respectively for pivotally supporting and hoisting movable ramp member 19. Framework 49 includes horizontally extending base structure 51 and horizontally spaced pairs of support members 53, 53 (only one member 53 illustrated) and 55, 55 fixed to and extending upwardly from base structure 51. A horizontally extending pivot shaft 57 extends through treadway structure edge portion 45. The opposite end portions of pivot shaft 57 are journaled respectively in the upper end portions of paired support members 53, 53.

The hoisting means of ramp unit 47 includes a shaft 59 journaled at the opposite end portions thereof in the upper end portions respectively of paired vertical support members 55, 55. Pulleys 61, 61 are fixedly secured on the opposite end portions of shaft 59. Cables 63, 63 are fixedly secured in eye members 65, 65 fixed in edge portion 45' of ramp member 19 and are turned around and secured respectively to pulleys 61, 61. Torsion means including a motor 67 and gearbox means 69 provide means for bi-directional rotational movement of shaft 59 and for pivotally raising and lowering ramp member 19.

Ramp unit 47 is horizontally and vertically movable. The means for moving ramp unit 47 preferably includes fluid operable elevating means, wheeled carriage means, and trackway structure. Trackway structure 71, including paired rails 73, 73 is surmountably fixed respectively to the upper end portions of ramp parts 75, 75, 75 of hydraulic jack means 77, 77, 77. A carriage 79 running on rails 73, 73 supportingly engages base 51 of framework 49; flanged wheels 81 journaled respectively to carriage frame 83 rollingly engage trackway rail 73, 73. Carriage 79 and ramp unit 47 are adapted to be manually moved or moved by suitable means along trackway 71 for horizontally positioning the movable ramp member.

Trackway 71 and paired rails 73 are preferably broken as at 82, 84 to divide the trackway and rails into three sections 71', 71'', 71''' and 73', 73'', 73''' with each of the sections supported by a separate jack means 77 so that if desired the sections can be rotated about a vertical axis for a purpose which will be understood in the description to follow later in the specification. Normally, however, the sections 71', 71'', 71''' are kept in alignment and moved together by the coordinated operation of jack means 77.

Apparatus 11 is adapted to elevate and horizontally shift an automobile onto the treadway structure of a selected ramp of fixed ramp bank 25 or 25'. The steps or procedure carried out in shifting automobile 13 to or from a fixed ramp member 17 of bank 25 is somewhat different from the steps or procedure carried out in shifting automobile 13 to or from a fixed ramp 17' of bank 25'.

To elevate and horizontally shift automobile 13 from the ground or base surface 85 to a selected ramp member 17 of bank 25 the following procedure may be carried out: Movable ramp member 19 is arranged in a substantially horizontal neutral position and with treadway structure edge portions 45, 45' positioned respectively at a level corresponding substantially with the level of base surface 85. Ramp member 19 is moved by carriage 79 horizontally along trackway 71 to a desired position. Automobile 13 is then moved onto and centered on treadway structure body portion 43 of ramp member 19. Ramp member 19 is elevated by jack means 77, 77, 77 to a desired elevation and to a position so that edge portion 45 aligns with edge portions 33 of a selected one of fixed ramp members 17. Motor 67 and the hoisting means of ramp unit 47 is then activated and ramp 19 moved to raised position R. (The movable ramp is elevated and tilted and arranged as shown in the broken line position indicated in FIG. 1.) With ramp member 19 and automobile 13 arranged as indicated in position X, check means 23 of ramp member 19 is retracted. The retraction of check member 23 permits automobile 13 to move downwardly under the force of gravity along treadway structure 41, to cross over to fixed ramp member 17 and upwardly along treadway structure 31 of the fixed ramp; automobile 13 moves along a sweeping path and upwardly under the influence of inertia; the forward wheel of the automobile passes over fixed ramp check means 21 and the check means is actuated upwardly and chocks the forward wheel, thus holding the automobile in an inclined and elevated disposition on the fixed ramp. To move automobile 13 from a fixed ramp 17, and to retrieve the automobile to base surface 85, ramp 19 is moved into said neutral position, check means 21 is released to allow the automobile to roll onto ramp 19, whereupon the automobile is stopped by check means 23'. The ramp 19 is then lowered by jack means 77, 77, 77 to a position wherein edge portion 45 is adjacent base surface 85 and the automobile can then be driven off or moved off by tilting ramp 19 to the raised position R.

To elevate and horizontally shift automobile 13 from base surface 85 to a selected ramp member 17' of bank of ramp members 25', the following procedure may be carried out: Movable ramp member 19 is positioned horizontally in a neutral position and arranged at a level corresponding to the level of surface 85 and automobile 13 is positioned on treadway structure 43. Ramp member 19 is elevated by jack means 77 to a position whereby treadway structure edge portion 45' of ramp member 19 is in register with treadway edge portion 33' of a selected one of ramp members 17'. Ramp member 19 is then pivotally tilted about edge portion 45' and the ramp member arranged as shown in the broken line position indicated Y in FIG. 1.

In pivotally tilting ramp 19, synchronous or coordinated functions are carried out by the elevating and hoisting means of the apparatus: To move ramp 19 from a neutral position to the positon indicated Y, hoisting cables 63, 63 are slacked off a distance corresponding substantially to the lifted distance of jack means 77. With ramp 19 in indicated position, Y check means 23' is actuated and the plunger member thereof retracted. Released automobile 13 moves downwardly and across the juncture between the fixed and movable ramps and upwardly; automobile 13 sweeps upwardly along the treadway structure of fixed ramp 17'. As the rear wheel of automobile 13 passes over check means 21', the check means plunger member is actuated outwardly to chock the wheel and hold the automobile in a raised and inclined disposition. To retrieve automobile 13 from fixed ramp 17' to base surface 85, the above-described steps are carried out substantially in a converse manner.

It will be understood that, if desired, trackways 71', 71'', 71''' may be turned 180° from the positions shown in the drawings by rotation of the trackways about vertical axes through the jack means 77 so that the automobile 13 can be discharged into either of the banks 25, 25' by either of the heretofore mentioned means, that is, by the means which involves moving ramp member 19 to the raised position R or the lowered position L. Each of check means 21, 21', 23 and 23' preferably includes a spring urged translationally reciprocative plunger 87 having a slanted top surface 89. Each plunger 87 is adapted to be moved between an upwardly disposed and extended position to a downwardly disposed and retracted position. A compression spring 91 is adapted to translationally move plunger 87 to the extended position and to such a position in which top surface 89 projects above the top surface of the respective ramp treadway structure. Plunger 87 is adapted to be moved to a retracted disposition by a wheel of the automobile passing over the sloping top surface of the plunger and after the automobile wheel has passed over the plunger, spring 91 is adapted to automatically move the plunger to an extended position and to chock the wheel of the automobile. The means for retracting each plunger 87 preferably includes electrical solenoid means (not illustrated). The magnetic force of a solenoid operating against spring 91 provides means for retracting plunger 87 and for releasing automobile 13 for travel on a respective ramp surface.

Figure 3:
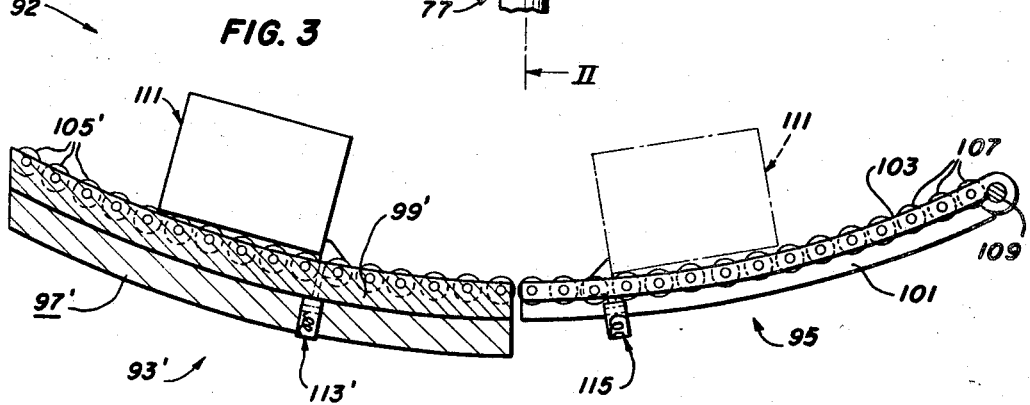
FIG. 3 is a schematic illustration of a modified embodiment of the apparatus adapted for handling a packaged product or freight container load object.

The modified embodiment of the apparatus illustrated in FIG. 3 is indicated by numeral 92 and is adapted to handle a product package or a freight container type load object. FIG. 3 shows only a fixed ramp member 93' and a co-acting movable ramp member 95. The remaining structure of the modified apparatus other than fixed and movable ramps 93', 95 is substantially the same as the above-described structure of apparatus 11 and for description of such structure, reference may be had to the above-described structure of apparatus 11.

Fixed ramp member 93' includes a stationary supporting structure 97' and curved or concave treadway structure 99'. Movable ramp member 95 includes rigid frame structure 101 and curved or concave treadway structure 103. Treadway structures 99' and 103 are preferably provided respectively with a plurality of parallel journaled rollers 105', 107. Pivotally raising and lowering movable ramp 95 about pivot shaft 109 functions to horizontally shift load object 111. Individually operative check means 113', 115 mounted respectively on fixed and movable ramps 93', 95 are adapted for releasably checking the movement of load object 111.

The modified embodiment of the apparatus illustrated in FIG. 4 is indicated by numeral 117 and is adapted to be incorporated in either the vehicular load handling apparatus 11 illustrated in FIGS. 1 and 2 or the inert container-type load object handling apparatus 92 illustrated in FIG. 3. Modified embodiment 117 chiefly concerns the movable ramp means only of the apparatus. The apparatus basically includes a movable ramp member 119, severed transversely and medially between the opposite end portions of the ramp member thereby providing first and second ramp sections 121, 123. A hinge shaft 125 hingedly connects first and second sections 121, 123. A pivot shaft 127 extending respectively through first section 121 pivotally supports ramp member 119. Second ramp section 123 is adapted to be pivotally moved upwardly and downwardly relative to first section 121. Unidirectionally operative stop means including stop members 129, 131 provide means for stopping the upward pivotal movement of second ramp section 123 relative to first ramp section 121. The relative arrangement of stop members 129, 131 is such that when second ramp section 123 is in a raised and stopped disposition, it forms substantially a continuous curve or arc with first section 121 (see broken line position in FIG. 4). Embodiment 117 includes a horizontally extending base member 133 and an upstanding support member 135 supporting ramp member pivot shaft 127. An upstanding abutment member firmly fixed from base member 133 is adapted to limit the downward pivotal movement of first section 121 of ramp member 119. Hoisting cables 139 (one shown) are attached to the distal end edge of second ramp section 123. When hoisting cables 139 are tensioned and retracted, second ramp section 123 is pivotally moved upwardly to a stopped position, and then first and second ramp sections are moved upwardly together about first ramp section pivot shaft 127.

Modified embodiment 117 functions primarily to increase the rate and distance of travel of a load object as it is removed from ramp member 119. The sectional movable ramp member of embodiment 117 requires less vertical space to function than does the solid or rigid ramp member 19 of apparatus 11; the warehouse or garage may be constructed with minimum spacing between floors. The embodiment is particularly adapted for use in apparatus designed for handling freight container load objects of relatively low vertical extension.

In the present specification and claims, it will be understood that when the term curve or curved is used to describe the treadways 17, 17', 41, 99', 103, 121, and 123, it will be understood that it is so constructed to cause the center of gravity of the vehicle or package thereon to travel a path other than a straight line, which shall not vary from the most congruent circle to the travel path by more than 3% of the circle's radius. Also, it will be understood that the term supporting structures of the treadways may be in other forms without departing from the spirit and scope of the present invention. For example, the treadway 31 may be integral with structure 29, may be self supporting or may be supported by other equivalent structure without departing from the spirit and scope of the present invention.

Although the present invention has been described in some detail by way of illustration and example, it is to be understood that it is not to be so limited since changes and modifications may be made therein which are within the full intended scope of this invention as hereinafter claimed.

I claim:

1. An apparatus for transferring a load object comprising fixed ramp means, said fixed ramp means including a plurality of fixed spaced ramp members, each of said ramp members including upwardly facing treadway structure, said treadway structure including a horizontally extending edge portion and a curved body portion inclined upwardly from said edge portion; movable ramp means comprising a movable ramp including an upwardly facing treadway structure having horizontally extending edge portions; means pivotally supporting said movable ramp about a horizontal pivot axis arranged adjacent one of said edge portions of said movable ramp and substantially parallel said edge portions of said movable ramp and with at least one of said treadway edge portions of said movable ramp being elevatingly positioned substantially on a level corresponding with the level of said treadway edge portion of said fixed ramp; said movable ramp being adapted to be pivotally moved between a raised position in which said curved body portion thereof is inclined upwardly in a generally upwardly curved relationship with the upwardly inclined body portion of said fixed ramp treadway structure, and a neutral position in which said curved body portion of said movable ramp treadway structure is arranged in a generally horizontal disposition; hoisting means for pivotally raising and lowering said movable ramp; and means on said fixed and movable ramps for engaging and releasably checking the movement of a load object moving respectively on the treadway structure of said fixed and movable ramps, said movable ramp means including framework means firmly integrally securing said movable ramp, said supporting pivot means and said hoisting means together thereby forming a movable ramp unit, and said movable ramp means including means for moving said ramp unit and for selectively positioning one of said treadway edge structures of said movable ramp in registry with the treadway edge portion of a selected ramp member of said fixed spaced ramp members.

2. The apparatus of claim 1 which is adapted to elevate and horizontally shift a vehicular load object having supporting wheels and in which said treadway structure respectively of said fixed and movable ramp means includes respectively structure defining substantially a smooth curved running surface for supportingly engaging the wheels of said load object.

3. The apparatus of claim 1 which is adapted to elevate and horizontally shift a load object having a substantially smooth, flat undersurface and in which said treadway structures respectively of said fixed and movable ramps include a plurality of free-turning rollers, each roller having an upwardly orientated peripheral surface portion operatively engageable with the undersurface of said load object, said plurality of rollers being parallel journaled with the plurality of surface portions being relatively arranged in curved arrangement for rollingly engaging and supporting the moving load object.

4. An apparatus for transferring a load object comprising fixed ramp means including a fixed ramp including upwardly facing treadway structure, said treadway structure including a horizontally extending edge portion and a curved body portion inclined upwardly from said edge portion; movable ramp means comprising a movable ramp including an upwardly facing treadway structure having a horizontally extending edge portion and a curved body portion integrally secured to said edge portion; means pivotally supporting said movable ramp about a horizontal pivot axis arranged adjacent and substantially parallel said edge portion of said movable ramp and with said treadway edge portion of said movable ramp being elevatingly positioned substantially on a level corresponding with the level of said treadway edge portion of said fixed ramp; said movable ramp being adapted to be pivotally moved between a raised position in which said curved body portion thereof is inclined upwardly in a generally upwardly curved relationship with the upwardly inclined body portion of said fixed ramp treadway structure, and a neutral position in which said curved body portion of said movable ramp treadway structure is arranged in a generally horizontal disposition; hoisting means for pivotally raising and lowering said movable ramp; and means on said fixed and movable ramps for engaging and releasably checking the movement of a load object moving respectively on the treadway structure of said fixed and movable ramps, said fixed means including at least two relatively oppositely arranged fixed ramp members including an upper ramp member and a lower ramp member horizontally spaced from said upper ramp member and said movable ramp means including framework means firmly integrally securing said movable ramp, said supporting pivot means, and said hoisting means together thereby forming a movable ramp unit, and said movable ramp means including means for horizontally and vertically moving said movable ramp unit relative to said upper or said lower fixed ramp members and for positioning said treadway structure edge portion of said movable ramp in horizontal and vertical registry with the treadway structure edge portion of a selected ramp member of said upper and said lower ramp members.

5. The apparatus of claim 4 in which said means for horizontally and vertically moving said movable ramp unit includes a horizontally extending trackway, wheeled carriage means rollingly engaging said trackway and supporting said movable ramp unit for movement along said trackway, and operative elevating means for raising and lowering said trackway and said movable ramp unit.

6. An apparatus for elevating and horizontally shifting a load object comprising a fixed ramp means including a plurality of fixed ramp members with each member including rigid supporting structure and upwardly facing treadway structure superjacently secured to and firmly supported by said supporting structure, said treadway structure of each fixed ramp member including a horizontally extending edge portion and a curved body portion inclined upwardly from said edge portion; a first bank of fixed ramp members horizontally and vertically spaced and arranged in uniformly orientated relationship and with the treadway structure edge portion of each fixed ramp member being contiguous a vertical surface common to each other fixed ramp member edge portion of said first bank of fixed ramp members; a second bank of fixed ramp members horizontally and vertically spaced and arranged in uniformly orientated relationship and with the treadway edge portion of each fixed ramp member being contiguous a vertical surface common to each other fixed ramp member edge portion of said second bank of fixed bank members, and further with the vertical surface of said first and the vertical surface of said second bank of fixed ramp members being parallel and with the ramp members respectively of said first and second bank of members being oppositely orientated; movable ramp means including a movable ramp member including a rigid frame structure and an upwardly facing treadway structure superjacently secured to and supported by said frame structure and with said movable ramp treadway structure including an upwardly curved body portion and substantially parallel horizontally extending first and second edge portions, pivot means pivotally supporting said movable ramp member about a horizontal axis arranged adjacent and substantially parallel said first edge portion of said movable ramp member, hoisting means for pivotally raising and lowering said movable ramp members; framework means firmly integrally securing said movable ramp member, said supporting pivot means, and said hoisting means together thereby forming a movable ramp unit; means for moving said movable ramp unit relative to said first bank of fixed ramp members for positioning said treadway structure first edge portion of said movable ramp member in registry with the treadway structure edge portion of a selected fixed ramp member of said first bank of fixed ramp members; and means including said hoisting means and said means for horizontally and vertically moving said movable ramp unit, for operatively moving said movable ramp unit relative to a selected ramp member of said second bank of fixed ramp members and for operatively tilting said movable ramp member substantially about a horizontal axis arranged adjacent and parallel said second edge portion of said movable ramp member; and individually operative first and second check means operatively connected respectively with said fixed and said movable ramp members for engaging and releasably checking the movement of a load object moving respectively on the treadway structure of a fixed or a movable ramp member.

7. The apparatus of claim 6 in which said movable ramp member is severed transversely along said upwardly concave body portion and substantially medially between said parallel horizontally extending first and second edge portions of said movable ramp member treadway structure and includes, a first ramp section, a second ramp section, hinge means hingedly connecting said first and second ramp sections for hinged movement of said second section upwardly and downwardly relative to said first ramp section, and includes uni-directionally operative stop means for stopping the upward movement of said second section relative to said first section and for stopping said second section at a position whereby the treadway structure respectively of said first and second sections form substantially a uniform curve, and abutment means fixedly arranged relative to said first ramp section for limiting the downward pivotal movement of said first section.

References Cited
UNITED STATES PATENTS
1,841,530  1/1932  Geigel _____ 214—16.1

FOREIGN PATENTS
367,376  1/1923  Germany.
644,705  9/1962  Italy.

ROBERT G. SHERIDAN, *Primary Examiner.*
R. B. JOHNSON, *Assistant Examiner.*